United States Patent
Nunnally

(10) Patent No.: US 7,410,123 B2
(45) Date of Patent: Aug. 12, 2008

(54) AIRCRAFT AND HYBRID WITH MAGNETIC AIRFOIL SUSPENSION AND DRIVE

(76) Inventor: William C. Nunnally, P.O. Box 30545, Columbia, MO (US) 65205

( * ) Notice: Subject to any disclaimer, the term of this patent is extended or adjusted under 35 U.S.C. 154(b) by 1142 days.

(21) Appl. No.: 10/276,884

(22) PCT Filed: May 15, 2001

(86) PCT No.: PCT/US01/15901

§ 371 (c)(1),
(2), (4) Date: Nov. 15, 2002

(87) PCT Pub. No.: WO01/87707

PCT Pub. Date: Nov. 22, 2001

(65) Prior Publication Data

US 2004/0069901 A1    Apr. 15, 2004

Related U.S. Application Data

(60) Provisional application No. 60/204,182, filed on May 15, 2000.

(51) Int. Cl.
*B64C 27/20* (2006.01)
(52) U.S. Cl. .................................. 244/23 C
(58) Field of Classification Search ............. 244/12.1, 244/23 C, 39, 17.11, 17.23, 34 A, 1 R; 416/128, 416/115, 98, 102
See application file for complete search history.

(56) References Cited

U.S. PATENT DOCUMENTS

| | | | |
|---|---|---|---|
| 2,378,617 A | 6/1945 | Burke | |
| 3,417,825 A | 12/1968 | Ramme | |
| 3,507,461 A | 4/1970 | Rosta | |
| 3,632,065 A | 1/1972 | Rosta | |
| 3,638,421 A * | 2/1972 | Chilman | 60/797 |
| 3,689,011 A | 9/1972 | Torelli | |
| 3,946,970 A | 3/1976 | Blankenship | |
| 3,997,131 A | 12/1976 | Kling | |
| 4,050,652 A * | 9/1977 | DeToia | 244/23 C |
| 4,173,321 A | 11/1979 | Eickmann | |
| 4,434,130 A | 2/1984 | Salisbury | |
| 4,709,883 A | 12/1987 | Giuliani et al. | |
| 4,807,830 A * | 2/1989 | Horton | 244/12.2 |

(Continued)

*Primary Examiner*—Tien Dinh
(74) *Attorney, Agent, or Firm*—J. Charles Dougherty

(57) ABSTRACT

An aircraft is disclosed that comprises a fuselage with first and second wings non-rotatably secured to and extending from sides of the fuselage. Inner and outer tracks are secured to and encircle the fuselage, and airfoils are operably secured between the inner and outer tracks. Means are provided for rotating the airfoils. The means for rotating the airfoils may be comprised of first and second drive coils, and first and second alternators may be operably coupled to the first and second drive coils, respectively, to provide redundant power supplies. Permanent magnets in the rotor hub may be arranged in a Halbach array or may be arranged to provide a series of alternating, opposite magnetic poles. Separate drive and suspension coils may be provided in the stator. The concept may find further application in a lift fan or tail section of conventional aircraft. In that regard, a lift fan or tail section may be provided in which a stator magnetically levitates a lift fan rotor or tail rotor. The stator may include suspension coils and drive coils to eliminate the need for a drive shaft and gears to power the lift fan rotor or tail rotor.

10 Claims, 13 Drawing Sheets

U.S. PATENT DOCUMENTS

| | | |
|---|---|---|
| 4,913,376 A | 4/1990 | Black |
| 5,064,143 A * | 11/1991 | Bucher .................. 244/23 C |
| 5,072,892 A * | 12/1991 | Carrington ............. 244/23 C |
| 5,351,913 A | 10/1994 | Cycon et al. |
| 5,495,221 A | 2/1996 | Post |
| 5,507,453 A | 4/1996 | Shapery |
| 5,669,470 A | 9/1997 | Ross |
| 5,705,902 A | 1/1998 | Merritt et al. |
| 5,783,885 A * | 7/1998 | Post ........................ 310/90.5 |
| 5,836,542 A * | 11/1998 | Burns ....................... 244/12.2 |
| 5,863,203 A | 1/1999 | Bragdon |
| 6,101,952 A | 8/2000 | Thornton et al. |
| 6,111,332 A | 8/2000 | Post |
| 6,331,744 B1 * | 12/2001 | Chen et al. ................. 310/171 |
| 6,575,401 B1 * | 6/2003 | Carver ...................... 244/12.2 |

* cited by examiner

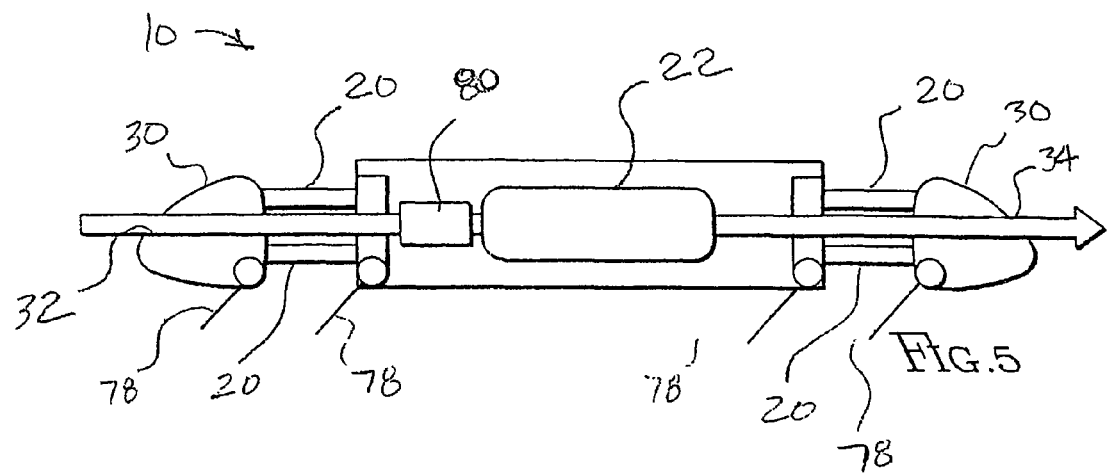
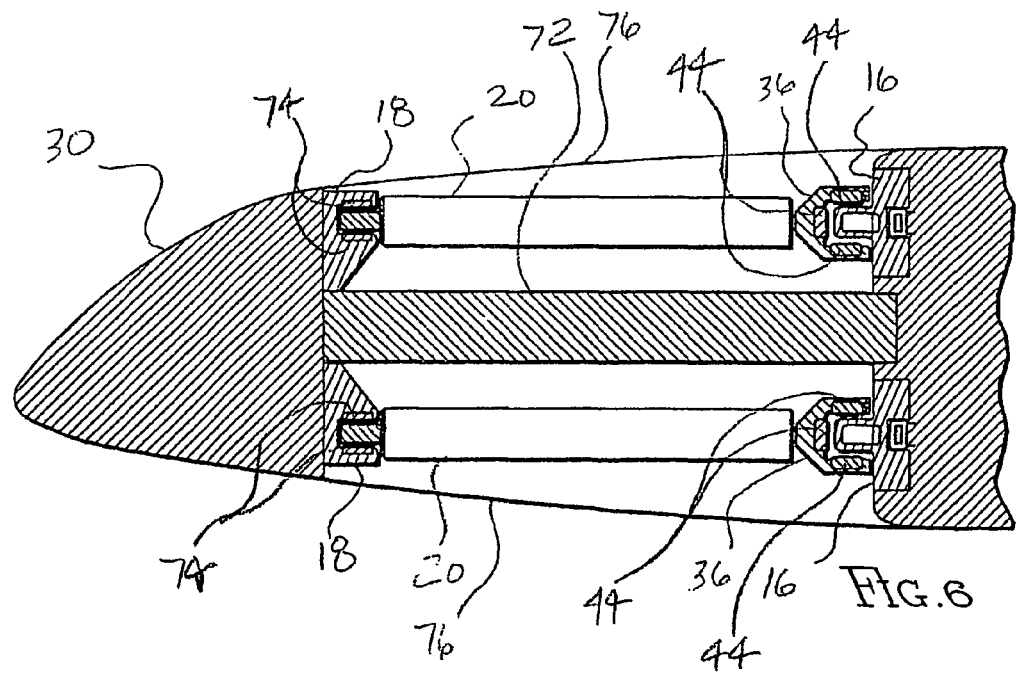

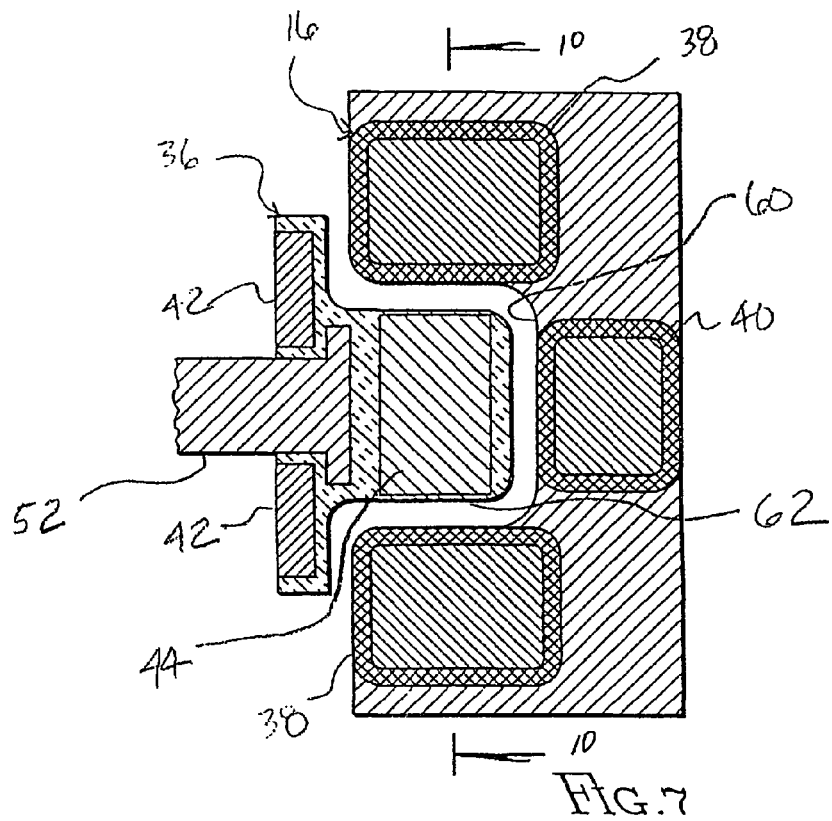
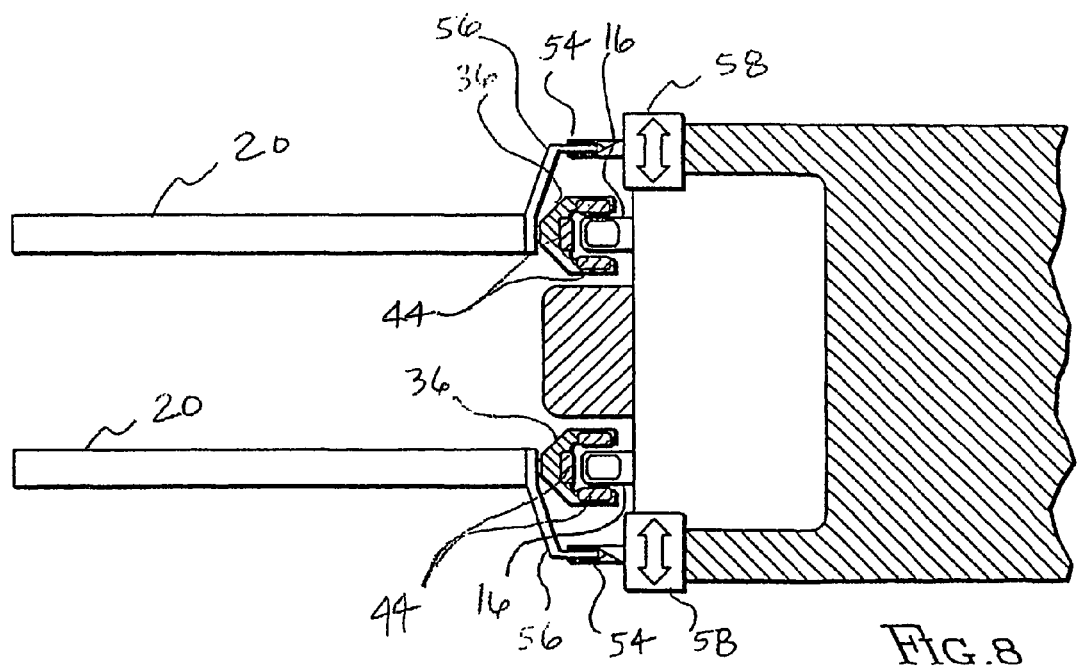

AIRCRAFT AND HYBRID WITH MAGNETIC AIRFOIL SUSPENSION AND DRIVE

This application is a continuation-in-part of U.S. Provisional Patent Application No. 60/204,182, filed on May 15, 2000.

BACKGROUND OF THE INVENTION

This invention relates to aircraft, and more particularly, to a rotorcraft hybrid that incorporates a magnetic or electromagnetic vertical takeoff and landing ("VTOL") system or an aircraft that uses a magnetic suspension and drive for a tail rotor or lift fan.

Conventional helicopters or rotorcraft are versatile aircraft that allow for vertical takeoff and landing and that offer reasonable amounts of vertical lift and horizontal speed up to the retreating blade limit. The basic helicopter configuration is the result of mechanical evolution that applied the present state of the art over many years. While the conventional rotorcraft offers many advantages, it still suffers from a number of disadvantages. For example, rotor blades are long but provide meaningful lift over only a relatively short segment at the ends of the rotor blades. This means that the center of the rotor area is not being effectively utilized. Also, because the hub about which the rotor blades rotate is relatively small, only a small number of airfoils may be used. Similarly, because the rotor shaft is relatively small, the weight of the craft and any load carried may place significant stress on the shaft. These disadvantages severely restrict the lift capabilities of rotorcraft. Further, having the center of gravity displaced substantially below the center of lift leads to a relatively unstable configuration. Further still, the horizontal speed of conventional rotorcraft is undesirably limited by the retreating blade limit. Also, a tail rotor is needed for stability, and tail rotors of conventional helicopters suffer from a number of problems. For example, mechanical linkages, such as drive shafts and gears, that mechanically couple tail rotors to main engines add unnecessarily to the weight of helicopters and can cause mechanical and reliability problems.

Conventional fixed wing aircraft are versatile as well and offer many advantages. Aerodynamic advantages allow fixed wing aircraft to travel at greater speeds and carry heavier payloads. Still, conventional fixed wing aircraft typically lack VTOL capabilities. Hybrid aircraft such as the Harrier, Osprey, and Joint Strike Fighter have been developed in an attempt to offer a fixed wing aircraft having VTOL capabilities or very short takeoff and landing ("VSTOL") capabilities. While these are remarkable aircraft, they too suffer from a number of shortcomings. For example, the vertical lift capabilities of these aircraft is quite limited and do not approach the vertical lift capabilities offered by many conventional helicopters, so they are poor candidates for transporting heavy payloads. Also, these aircraft are relatively unstable during VTOL or VSTOL maneuvering. Further still, mechanical linkages, such as drive shafts and gears, that mechanically couple lift fans and turbine engines can add unnecessarily to the weight of aircraft such as the Joint Strike Fighter and can lead to mechanical and reliability problems.

SUMMARY OF THE INVENTION

It is therefore an object of the present invention to provide a rotorcraft or rotorcraft hybrid that combines the VTOL capabilities of a rotorcraft with the speed of a fixed wing aircraft.

It is a further object of the present invention to provide a craft of the above type that offers superior lift capabilities.

It is a further object of the present invention to provide a craft of the above type that offers horizontal speed that is not limited by the speed of the retreating blade.

It is a further object of the present invention to provide a craft of the above type that offers superior stability during takeoff, landing, and cruising.

It is a further object of the present invention to provide a craft of the above type in which a majority of the airfoil length is used to provide lift.

It is a further object of the present invention to provide a craft of the above type in which the center of mass of the craft is located at or near the center of lift.

It is a further object of the present invention to provide a craft of the above type that offers aerodynamic shrouding of the airfoils.

It is a further object of the present invention to provide a craft of the above type that offers stealthy shrouding of the airfoils.

It is a further object of the present invention to provide a craft of the above type that uses electromagnetic means to suspend and drive the airfoils.

It is a further object of the present invention to provide a craft of the above type that provides strong, light rotor and stator hubs that allow for consistent drive and suspension despite some radial expansion of the rotor hub during operation.

It is a further object of the present invention to provide a craft of the above type that uses an increased number of airfoils for added lift capabilities.

It is a further object of the present invention to provide a craft of the above type that uses two sets of counter-rotating airfoils for increased stability without the need for a tail rotor.

It is a further object of the present invention to provide a craft of the above type that provides for safe continued suspension and driving of the airfoils in the event of a partial power failure.

It is a still further object of the present invention to provide a craft of the above type that provides for continued suspension and rotation of the airfoils even in the event of a total power failure.

It is a still further object of the present invention to provide a craft of the above type that incorporates a tail rotor or lift fan of a type that eliminates the need for a drive shaft and gears.

It is a still further object of the present invention to provide a craft of the above type that incorporates a tail rotor or lift fan in which a rotor is magnetically levitated and driven by a stator.

Toward the fulfillment of these and other objects and advantages, the aircraft of the present invention comprises a fuselage with first and second wings non-rotatably secured to and extending from sides of the fuselage. Inner and outer tracks are secured to and encircle the fuselage, and airfoils are operably secured between the inner and outer tracks. Means are provided for rotating the airfoils. The means for rotating the airfoils may be comprised of first and second drive coils, and first and second alternators may be operably coupled to the first and second drive coils, respectively, to provide redundant power supplies. Permanent magnets in the rotor hub may be arranged in a Halbach array or may be arranged to provide a series of alternating, opposite magnetic poles. Separate drive and suspension coils may be provided in the stator. The concept may find further application in a lift fan or tail section of conventional aircraft. In that regard, a lift fan or tail section may be provided in which a stator magnetically levitates a lift fan rotor or tail rotor. The stator may include suspension coils and drive coils to eliminate the need for a drive shaft and gears to power the lift fan rotor or tail rotor.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIGS. 3-5 are schematic, side elevation views of alternate embodiments of an aircraft of the present invention;

FIGS. 6-8 are sectional, side elevation views of alternate embodiments of an aircraft of the present invention;

DETAILED DESCRIPTION OF THE PREFERRED EMBODIMENT

Figure 1:
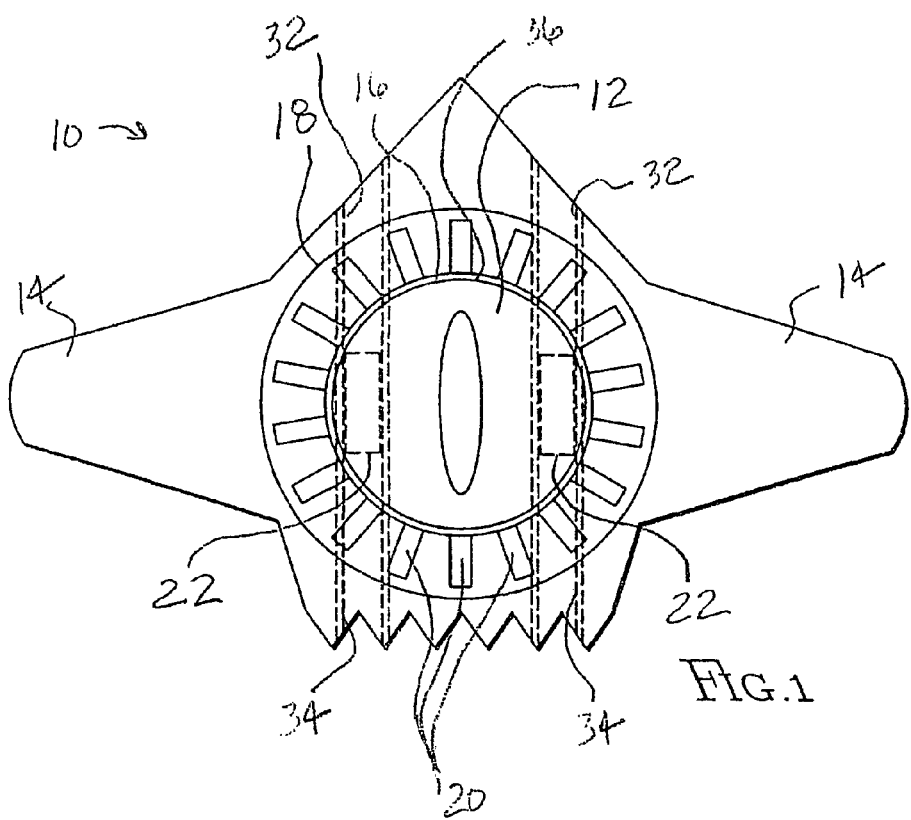
FIG. 1 is an overhead view of an aircraft of the present invention.

Referring to FIG. 1, the reference numeral 10 refers in general to an aircraft of the present invention. The aircraft has a fuselage 12, wings 14, inner and outer tracks or stators 16 and 18 encircling the fuselage, and airfoils 20 extending between the tracks 16 and 18. Means are provided for rotating the airfoils 20. Engines 22, such as turbine engines, may be provided.

Figure 2:
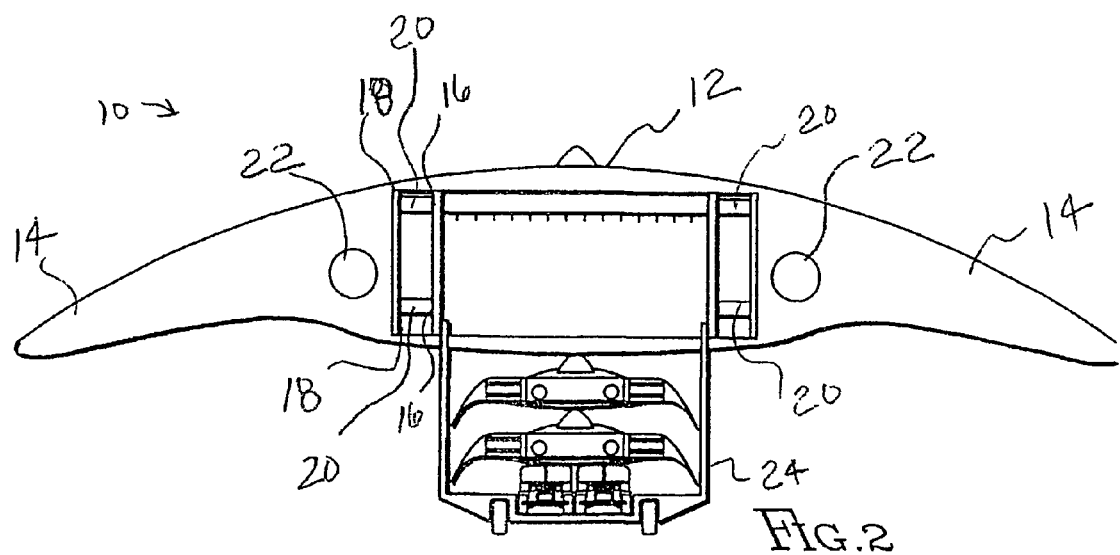
FIG. 2 is a rear view of an alternate embodiment of an aircraft of the present invention.
Figure 3:
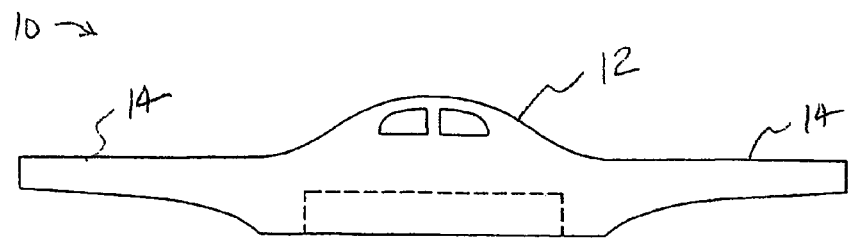
Figure 4:
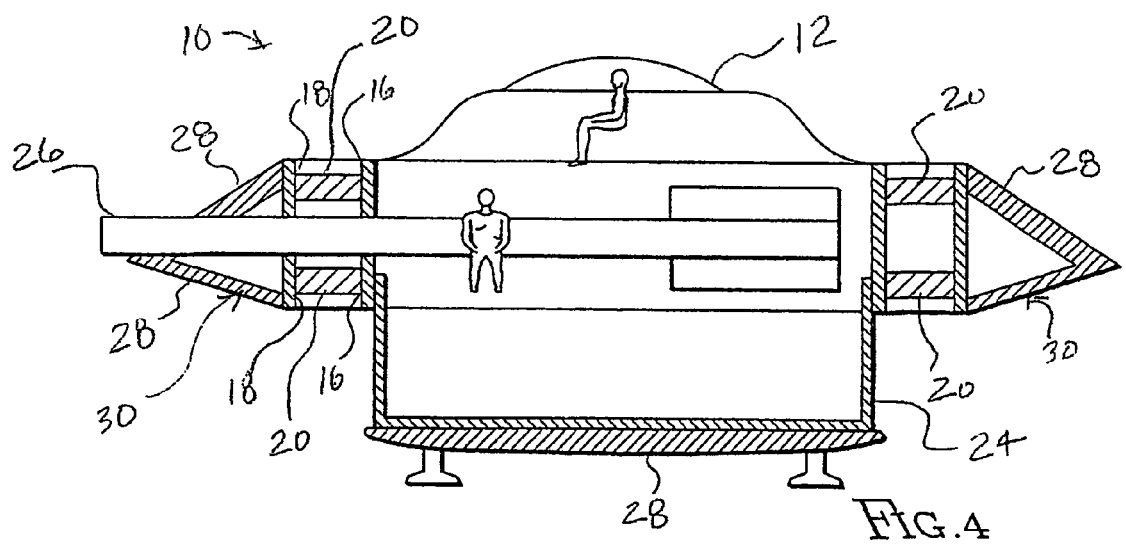

As illustrated in FIGS. 1-4, the fuselage 12 and wings 14 may take any number of shapes, sizes and configurations. Also, engines 22 may be affixed to the fuselage 12 or to the wings 14. Referring to FIG. 2, a cargo area 24 may form part of or be disposed below the fuselage 12. As shown in FIG. 3, in one alternate embodiment, the airfoils may be disposed below the fuselage 12 similar to a hovercraft. Although not clear from the schematic representation in FIG. 3, the top surface of the wing is shuttered for horizontal flight. As seen in FIG. 4, weapons 26, such as a large caliber gun, may be incorporated into the aircraft, and the aircraft may also include armor 28. As also seen in FIG. 4, the aircraft need not have wings 14 but may instead be used with or without a fairing 30. As best seen in FIG. 5, when an engine 22 is affixed to the fuselage 12, the engine may be disposed between upper and lower sets of airfoils, and an inlet air path 32 and outlet thrust path 34 may be provided for the engine 22 to receive inlet air and to provide thrust between the upper and lower sets of airfoils 20. Because the airfoils 20 are not disposed above the fuselage 12 as in a conventional helicopter, a safety ejection seat may be used in an aircraft of the present invention 10.

As illustrated in FIGS. 6-8, the rotor hubs 36, and therefore airfoils 20, are magnetically levitated and driven about stators 16. A rotor hub 36, stator hub 16, and associated support coils 38 and drive coils 40 form a large diameter, distributed, electric motor. Each set of airfoils 20, rotor hubs 36, and stators 16 are substantially identical, so only one of each will be described in detail. As best seen in FIG. 1, the stator hub 16 encircles the fuselage 12 to form a large diameter, circular, inner track 16. The stator hub 16 and rotor hub 36 may be shaped or configured in any number of ways for operably coupling the stator hub 16 and rotor hub 36. As seen in FIG. 6, the rotor hub 36 may be in the shape of an external hub that mates with a protruding portion of the track or stator 16. In this embodiment, the protruding portion of the stator 16 is comprised of an alternating series of support coils 38 and drive coils 40. The external rotor hub 36 is comprised of a lightweight metal with carbon fiber bands 42 embedded therein for further weight reduction.

Figure 9:
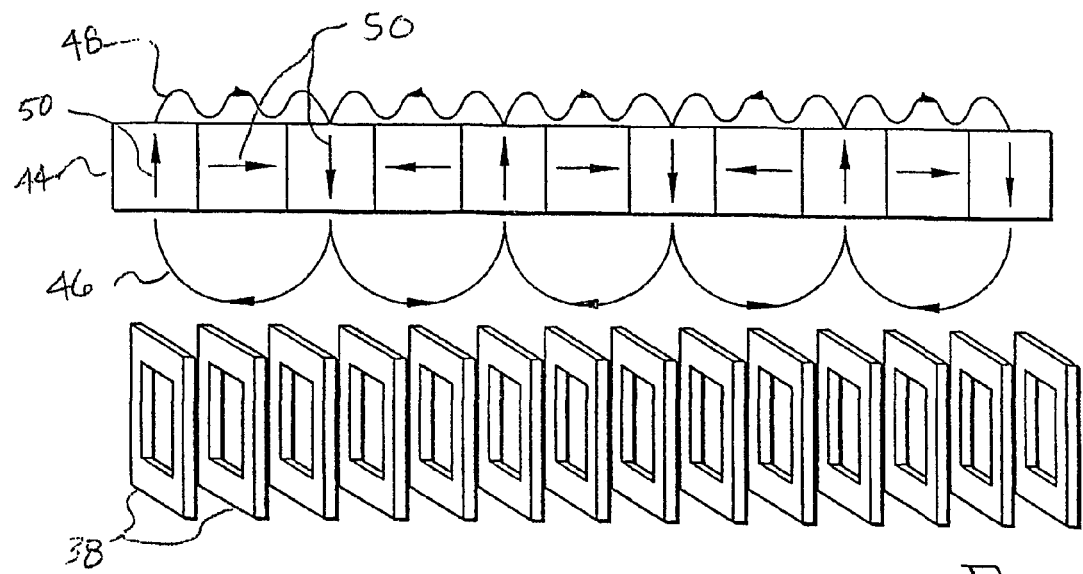
FIG. 9 is a schematic representation of a Halbach array of permanent magnets.

In the external rotor hub 36 embodiment depicted in FIGS. 6 and 8, three sets of permanent magnets 44 disposed in Halbach arrays are also disposed in the rotor hub 36 for interaction with the support 38 and drive coils 40 in the stator 16. As best seen in FIG. 9, a Halbach array is an arrangement of permanent magnets 44 that results in a periodic, permanent magnetic field on one side 46 and only a small magnetic field 48 on the other side, as illustrated in FIG. 9. FIG. 9 shows a Halbach array of permanent magnets 44 and its interaction with a series of conducting levitation and drive coils 40. Arrows 50 show the orientations of the polarities of the magnets 44, arrows 48 show how the magnetic fields cancel, and arrows 46 show how the magnetic fields combine. Moving the Halbach array past a series of conducting loops induces current in the loops, producing a magnetic field that opposes the magnet movement and that generates a repulsive force. Electric drive of the Halbach array is accomplished by interspersing current driven, conducting loops regularly between support or suspension loops 38 that generate a moving magnetic field that pulls or pushes the Halbach array along the conducting loop structure. This is similar to the Inductrak™ magnetically levitated train system developed at Lawrence Livermore National Laboratory.

Figure 11:
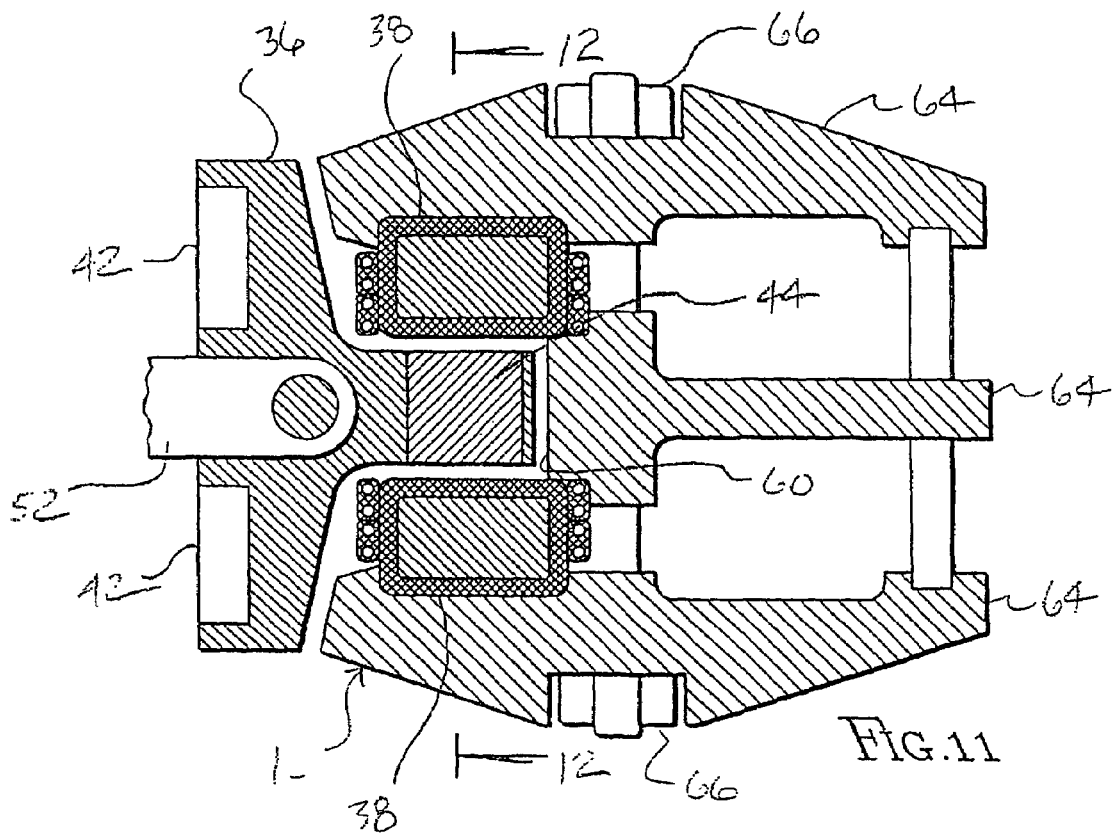
FIG. 11 is a sectional, side elevation view of an internal rotor hub and stator.

As best seen in FIGS. 7 and 11, airfoil supports 52 are secured to the rotor hub 36. As seen in FIG. 8, controlling the pitch of the counter rotating airfoils is also accomplished using magnetic bearings, such as Halbach bearings 54. The pitch of each airfoil 20 is controlled via a pitch control arm 56 that is connected to a skate that rides in a cylindrical magnetic bearing ring. The distance from the rotor hub 36 to the bearing ring is controlled with actuators 58 so that the ring controls the pitch of each airfoil 20. The pitch control system is similar to a swash plate in a conventional rotorcraft system.

Figure 10:
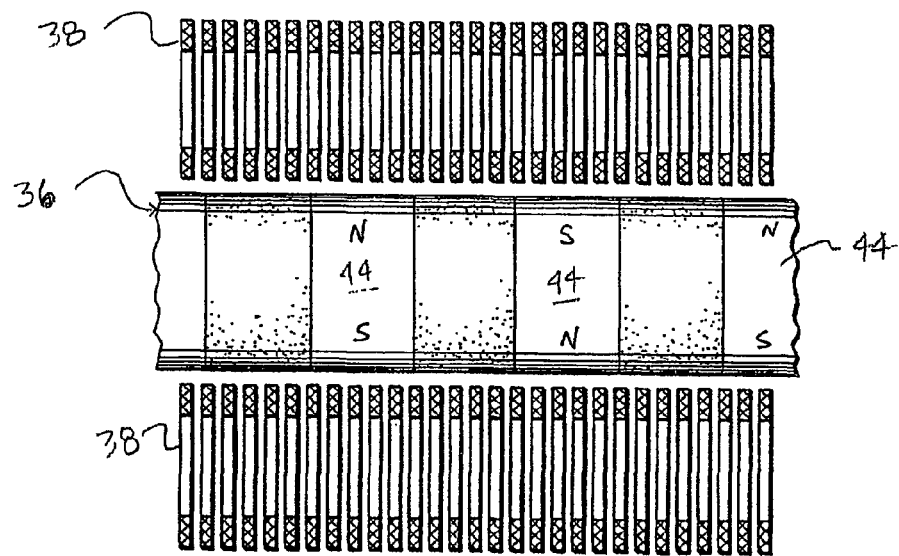
FIG. 10 is a sectional view of taken along line 10-10 or FIG. 7, showing an internal rotor hub and stator support coils.
Figure 12:
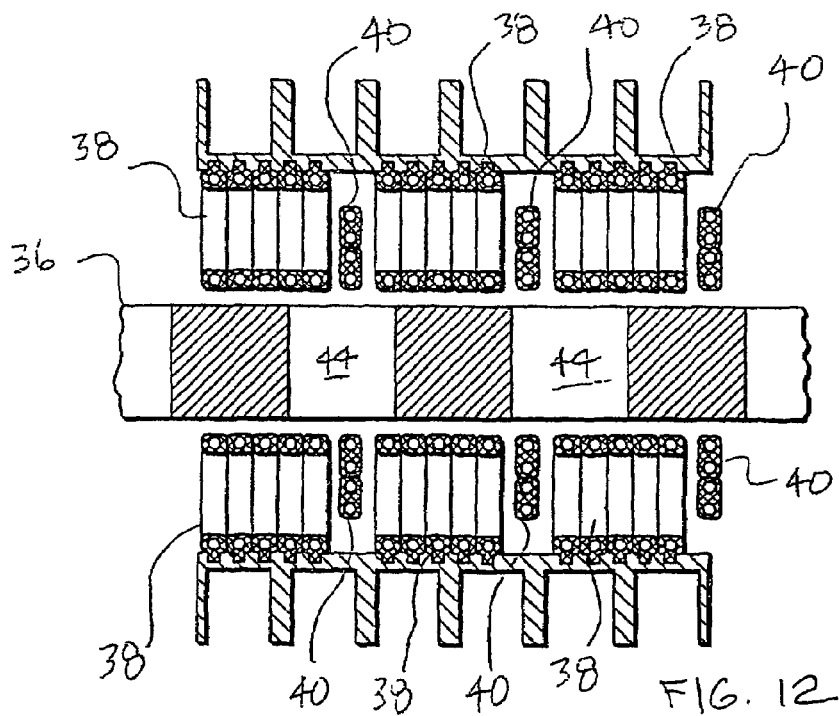
FIG. 12 is a sectional view taken along line 12-12 of FIG. 11.

In the preferred embodiment, the rotor hub 36 is an internal rotor hub such as shown in FIG. 7. In this embodiment, a channel 60 is formed in the stator 16, and a flange portion of the internal rotor hub 36 fits within the channel 60. Sets of support coils 38 are disposed above and below the channel 60, and a set of drive coils 40 is disposed at an inner portion of the channel 60. Although not preferred, it is understood that drive coils 40 may be interspersed between support coils 38 above and below the channel 60. The rotor hub 36 is comprised of a lightweight metal with carbon fiber bands 42 embedded therein for further weight reduction. An airfoil support 52 is secured to the rotor hub 36. As seen in FIGS. 7 and 10, a series of permanent magnets 44 arranged with alternating poles is disposed in a flange area of the rotor hub 36. As best seen in FIG. 7, the permanent magnets 44 are covered with a thin conductor shield 62 to prevent the drive fields from reaching the magnets 44 and changing their magnetization. Covering the permanent magnets 44 with a thin conducting shield 62 to prevent cross-magnetization is an important feature. Although this feature may not be clearly shown in each drawing, it is understood that other permanent magnets 44 found in the rotors 36 will also use a similar thin conducting shield 62. This conducting covering of the magnets 44 in the flange area also serves to center the rotor hub 36 with respect to the stator 16 because the conducting surface interacts with the magnetic fields in the support coils 38. The internal rotor hub 36 configuration is shown in more detail in FIG. 11. As seen in FIG. 11, the top and bottom support coils 38 are held in place by top, center, and bottom clamps 64, secured in place with bolts 66. FIG. 12 shows the clamps 64 holding the support coils 38 in place, with the internal rotor hub 36 disposed between the upper and lower support coils 38. Although not depicted, corresponding support coils 38 positioned above and below the stator 16 may be connected in series to provide a "null flux" configuration as described in more detail below.

Table 1 sets forth sample, hypothetical parameters for two, representative embodiments of the present invention, representing versions for light and heavy duty.

TABLE 1

Hypothetical Parameters of Light and Heavy Duty Aircraft

| Parameters | Light | Heavy |
|---|---|---|
| Rotor Hub Parameters | | |
| Rotor Hub diameter | 5 m | 10 m |
| Rotor Hub circumference | 15.7 m | 37.68 m |
| Number of sectors | 12 | 28 |
| Number of airfoils/sector | 1 | 1 |
| Lift and Drag per Airfoil | | |
| Airfoil length | 1.2 m | 2 m |
| Airfoil chord | 0.5 m | 0.5 m |
| Air density | 1.29 kG/m$^3$ | 1.29 kG/m$^3$ |
| Lift coefficient | 0.8 | 0.8 |
| Drag coefficient | 0.05 | 0.05 |
| Avg airfoil velocity | 100 m/s | 100 m/s |
| Airfoil area | 0.6 m$^2$ | 1 m$^2$ |
| Lift/airfoil = 0.5*D*Af*Cl*Vt$^2$ | 3096 Nt | 5160 Nt |
| Drag/airfoil = 0.5*D*Af*Cd*Vt$^2$ | 193.5 Nt | 322.5 Nt |
| Number of airfoils/rotor hub | 12 | 28 |
| Number of rotor hubs | 2 | 2 |
| Total lift | 74,304 Nt | 288,960 Nt |
| Total lift | 7,582.0 kg | 29,485.7 kg |
| Total lift | 16,680.5 lbs | 64,868.6 lbs |
| Total lift | 8.3 Tons | 32.4 Tons |

TABLE 1-continued

Hypothetical Parameters of Light and Heavy Duty Aircraft

| Parameters | Light | Heavy |
|---|---|---|
| Total airfoil drag | 2,322.0 Nt | 9,030.0 Nt |
| Total airfoil drive power required | 232,200.0 Watts | 903,000.0 Watts |
| Total airfoil drive power required | 311.3 Hp | 1210.5 Hp |

Figure 13:
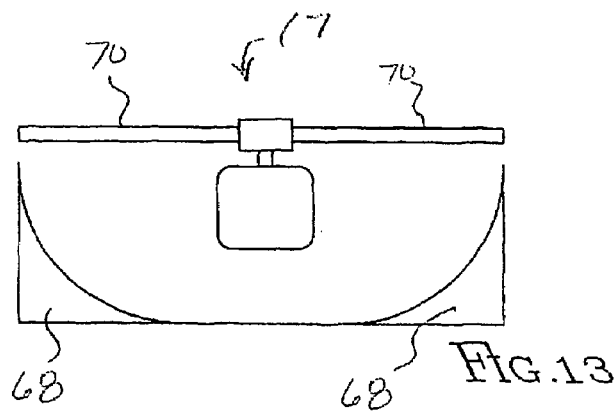
FIGS. 13 and 14 are graphical representations of total lift of a conventional helicopter and an aircraft of the present invention, respectively.
Figure 14:
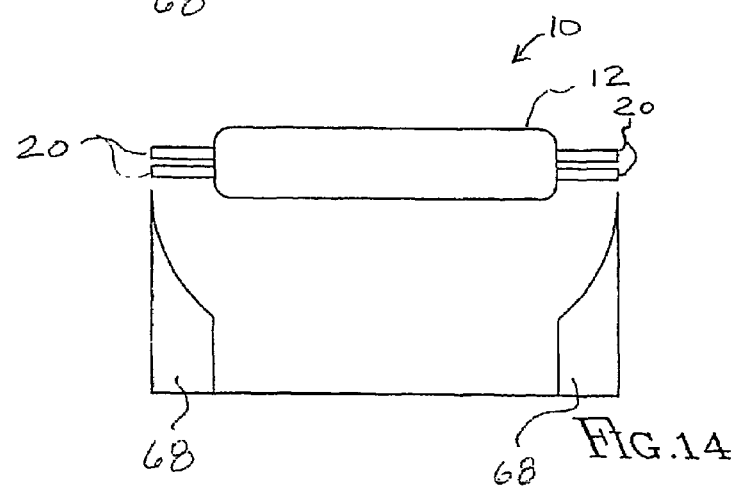

As illustrated by Table 1, the large diameter hub of the present invention allows the use of a larger number of rotor blades or airfoils 20 in a more efficient manner than conventional rotorcraft. This is also seen in FIGS. 13 and 14, which compare total lift of a conventional helicopter 67 to the total lift of an aircraft of the present invention 10. The areas 68 under the curves in FIGS. 13 and 14 represent the total lift of each rotorcraft or aircraft as a function of rotor blade 70 or airfoil 20 length. As illustrated by FIG. 13, because lift is proportional to the blade velocity squared, conventional helicopter rotor blades or airfoils 70 provide meaningful lift over only a relatively short segment at the ends of the rotor blades 70. FIG. 14 shows that comparable or superior results may be obtained using more airfoils 20 having shorter lengths rotating about a larger diameter.

Referring again to FIG. 6, the aircraft preferably has two sets of counter-rotating airfoils 20. A fairing 30 is preferably non-rotatably secured to the fuselage 12 by a support structure 72 disposed between the upper and lower sets of airfoils 20. A magnetic bearing 74 is provided on an inner portion of the fairing 30 to provide an outer track 18 to further guide the airfoils 20. The outer track 18 may be formed in any number of ways, quite similar to the inner track 16 described above. For example, a stator may be secured to the fairing 30, and the stator may mate with an internal or external rotor hub. Because the forces and lift requirements at the outer track 18 will typically be less extreme than at the inner track 16, and because there should be no need for drive means in the outer track 18, the construction of the outer track 18 may be greatly simplified. For example, the stator may simply have permanent magnets 44 disposed along upper and lower surfaces of a channel 60, and the ring hub rotor may be a simple metal hub, or a metal hub with embedded carbon fiber bands 42. Similar to the inner track 16, Halbach arrays of permanent magnets 44 may be used at the outer track 18 as well.

The fairing 30 may be aerodynamically shaped to act as an airfoil during forward movement and may be shaped to improve the stealth configuration of the aircraft. Shutters 76 may be provided to further improve the aerodynamic and stealth capabilities of the aircraft. Directional flaps 78 (FIG. 5) may also be used for improved low speed directional maneuvering and hovering. As illustrated by FIGS. 1 and 2, rather than employing a simple, circular, airfoil shaped fairing 30, the fairing 30 may take the shape of a more traditional fixed wing structure that may be non-rotatably secured to the fuselage 12 by the support structure 72. This would enable an aircraft of the present invention to provide hybrid characteristics similar to the Harrier, the Joint Strike Fighter, or the Osprey. As seen in FIGS. 1 and 2, the turbine engines 22 may be affixed to the fuselage 12, inside the circumference of the inner tracks 16, or may be affixed to the wings 14, outside the circumference of the outer tracks 18. As best seen in FIGS. 1 and 5, when the turbine engines 22 are affixed to the fuselage 12, the separation of the upper and lower sets of airfoils 20 allows the use of airflow inlets 32 and jet thrust apertures 34 that pass between the upper and lower sets of airfoils 20 and upper and lower inner and outer tracks 16 and 18.

Figure 15:
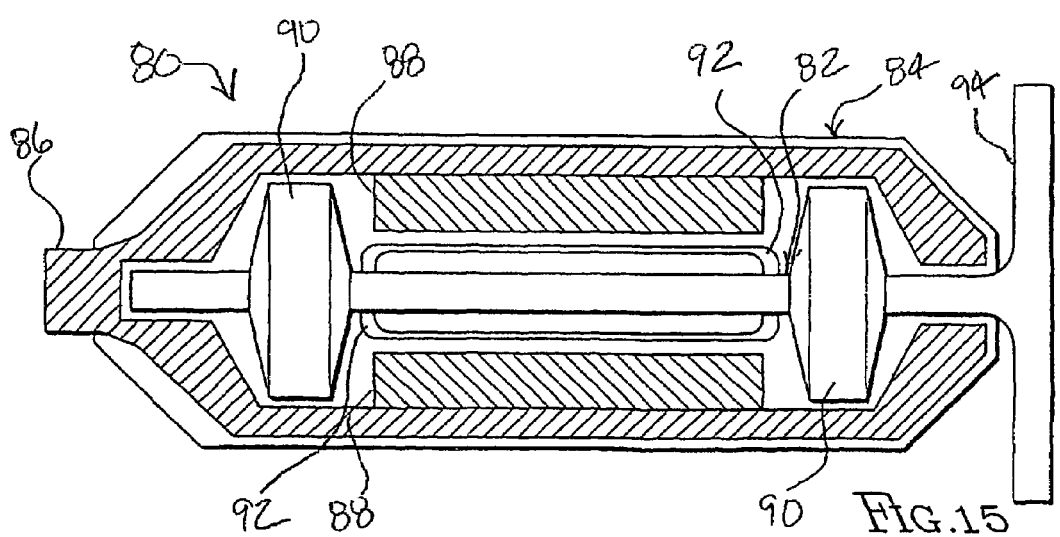
FIG. 15 is a sectional view of an alternator for use in practicing the present invention.

The requirements for an alternator 80 needed to drive the electromagnetic hubs of the present invention are challenging but obtainable. The alternator 80 must be compatible with jet engine rotational speeds and temperatures, controllable, lightweight, and capable of generating large amounts of electrical power. As seen in FIG. 15, a permanent magnet alternator 80 such as one developed at Lawrence Livermore National Laboratories, may be used to convert engine torque to electrical energy for powering the electromagnetic drive of the present invention and may be used for flywheel energy storage. This alternator 80 is capable of providing a specific power density of approximately 30 kW/kG. Because of its small diameter and simple, rugged construction, this alternator 80 is able to rotate at speeds of around 30,000 rpm without being torn apart by centrifugal forces. The alternator 80 is similar to a standard induction motor that is "turned inside out." In that regard, the stator 82 is on the inside, and the rotor 84 is on the outside. The stator 82 is coupled via shaft 86 to the turbine drive of a jet turbine engine 22 to provide the engine torque. A Halbach array of permanent magnets 88 is secured about the circumference of an inner portion of the rotor 84. Magnetic bearings 90 and a generator output winding 92 are secured to the stator 82. Electrical output passes through conductor 94. Although the alternator 80 may be a single-phase alternator, the alternator is preferably a multi-phase alternator and is more preferably a three-phase alternator.

Figure 16:
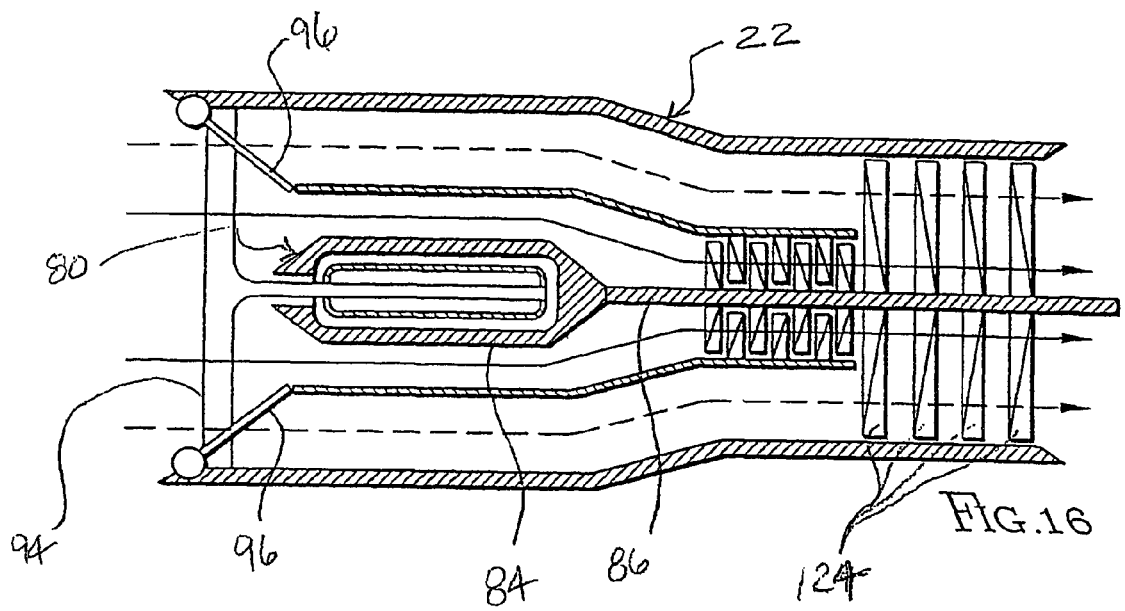
FIG. 16 is a sectional view of a variable bypass engine including an alternator.
Figure 17:
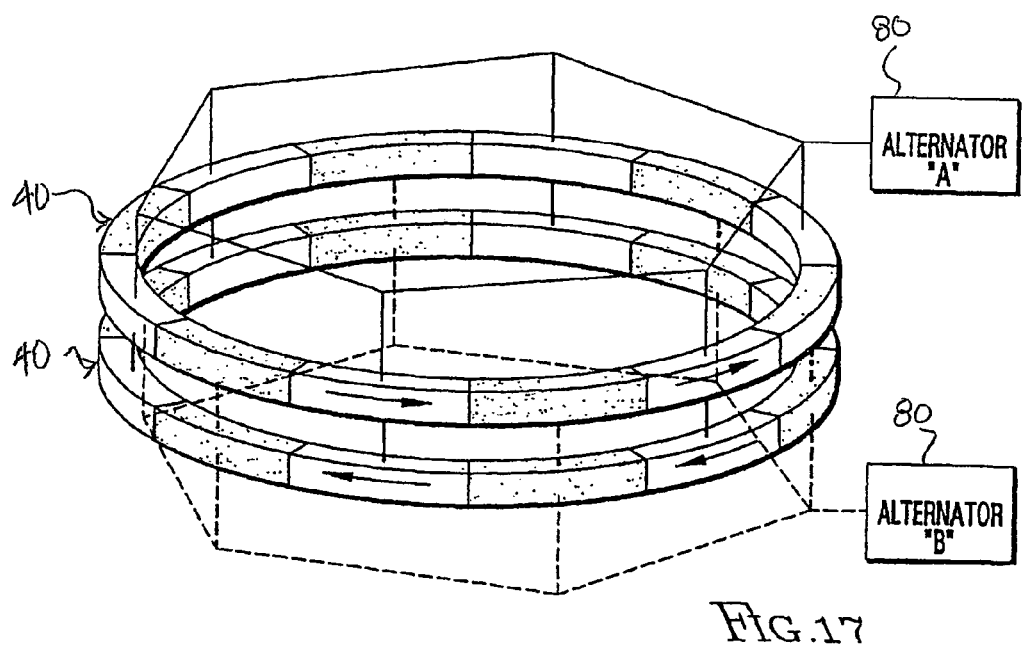
FIGS. 17 and 18 are schematic alternate embodiments showing alternators coupled with drive coils of upper and lower electric motors.
Figure 18:
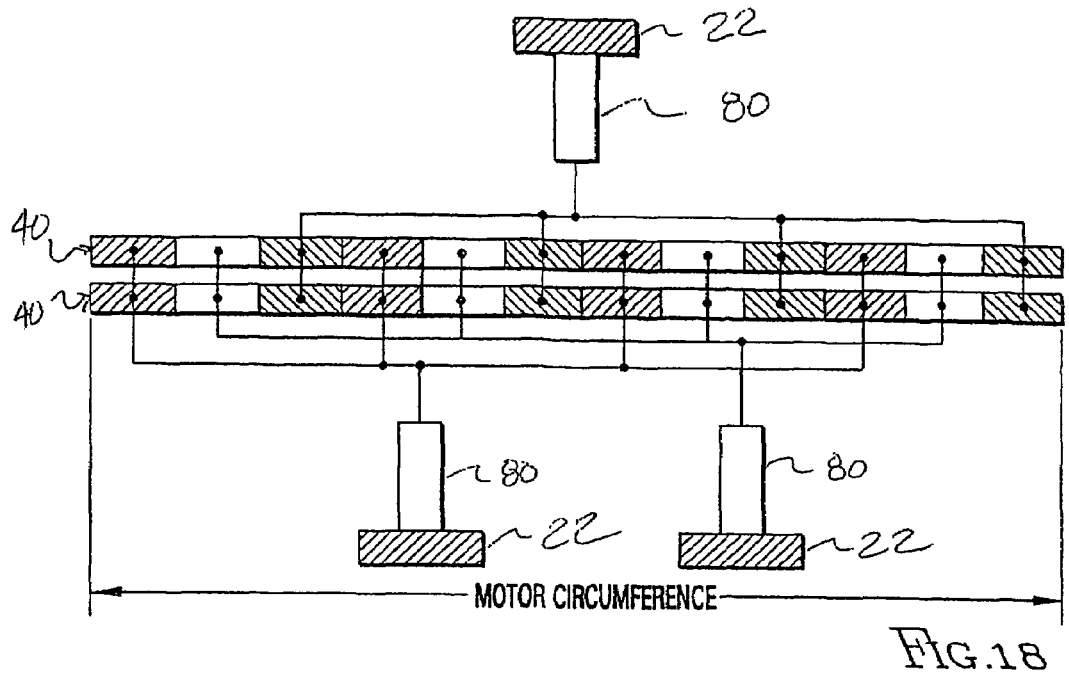
Figure 19:
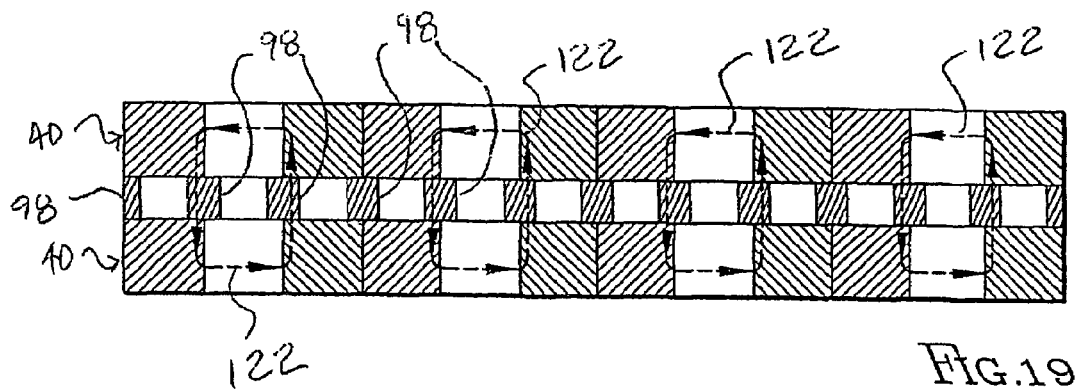
FIG. 19 is a schematic view of magnetic field paths when only a single alternator is active.

As seen in FIG. 16, the alternator 80 receives engine torque from and is located near the inlet of a jet turbine engine 22. The airflow at the inlet to the engine 22 cools the alternator 80, particularly the permanent magnets and alternator windings. The engine 22 is preferably a variable bypass engine that is capable of delivering varying amounts of power to the alternator 80 depending upon the needs of the system. Flaps or diverters 96 are operable to provide a variable inlet geometry. Referring to FIG. 17, the top and bottom electric motors are divided into multiple sections corresponding to one or more groupings of drive coils 40. As described in more detail below, for purposes of redundancy, the drive coils 40 in the unshaded sections of upper and lower electric motors are driven by alternator "A", and the drive coils 40 in the shaded sections of the upper and lower electric motors are driven by alternator "B". As also illustrated in FIG. 18, any number of engines 22 and alternators 80 may be used to drive the drive coils 40 in upper and lower electric motors. For reasons to be described, as seen in FIG. 19, magnetic field bridge paths 98 can be provided to magnetically couple corresponding sections of the upper and lower electric motors.

Figure 20:
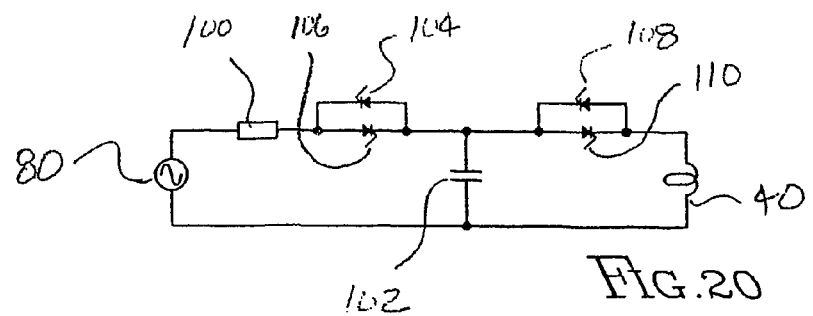
FIGS. 20-22 are diagrams of a power delivery system of the present invention.
Figure 21:
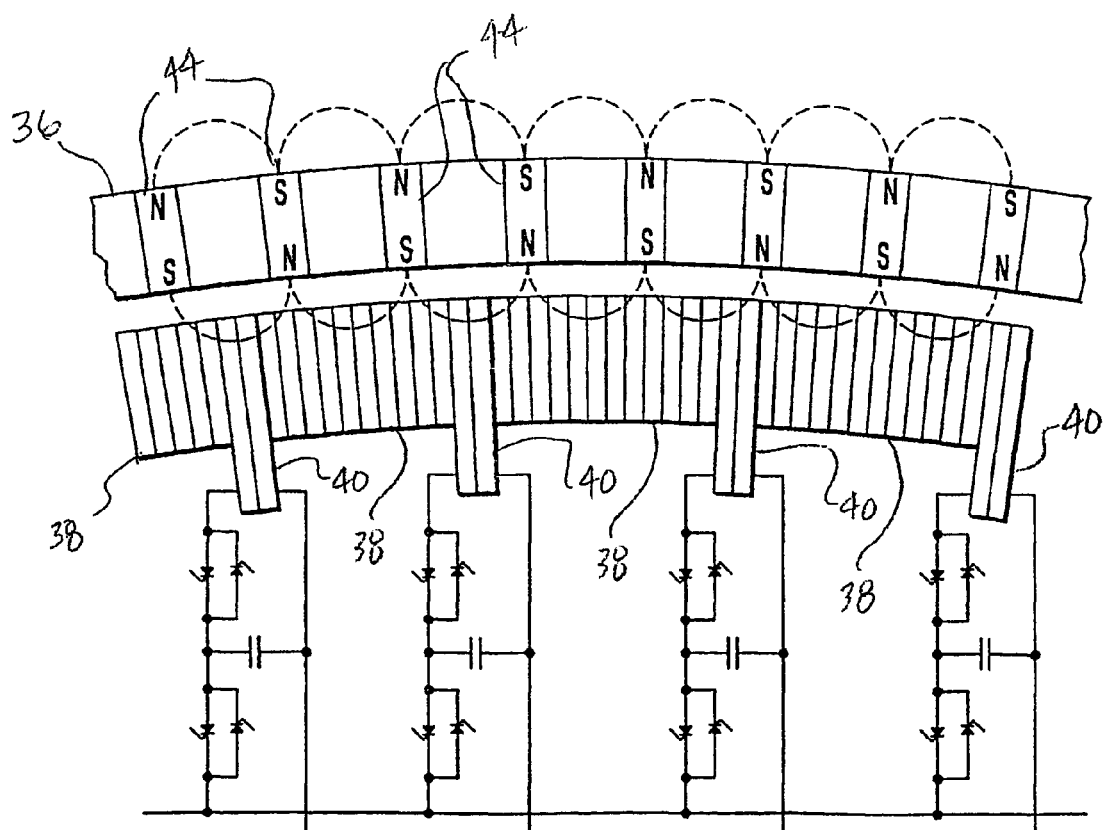
Figure 22:
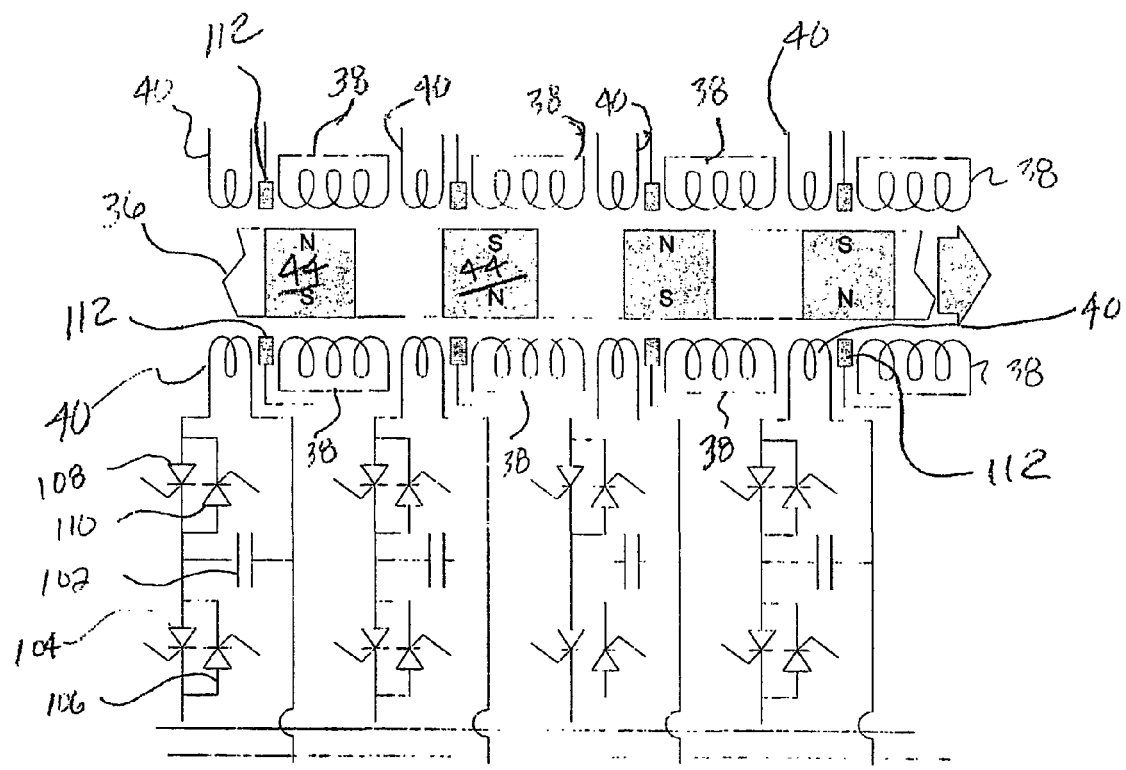

FIG. 20 depicts one embodiment of a system for energizing a drive coil 40 of the present invention. Alternator 80 provides high frequency current to alternator buss 100. Alternator buss 100 is electrically coupled with capacitor 102, and controlled rectifiers or CRs, CR-A 104 and CR-B 106, act as electronically controlled gates between the alternator buss 100 and capacitor 102. Capacitor 102 supplies lower frequency current to drive coil, with controlled rectifiers CR-C 108 and CR-D 110 acting as electronically controlled gates between the capacitor 102 and drive coil. As seen in FIGS. 21 and 22, drive coils 40 may be interspersed between support coils 38. As also seen in FIG. 22, each drive coil 40 has an associated sensor 112 that determines the polarity and position of the rotor 36 and that therefore determines when to initiate current flow to the drive coil 40. The distribution of drive coils 40 in between support coils 38 seen in FIG. 22 is similar to the distribution of drive coils in the Lawrence Livermore National Laboratory Inductrak™ system. Although not clear from FIG. 22, the drive coils 40 above the rotor 36 and below the rotor 36 are connected and driven in series to make the motor thrust symmetrical. In the preferred embodiment, such as seen in FIG. 7, planes of the support and drive coils 38 and 40 are perpendicular to minimize cross coupling.

Figure 23:
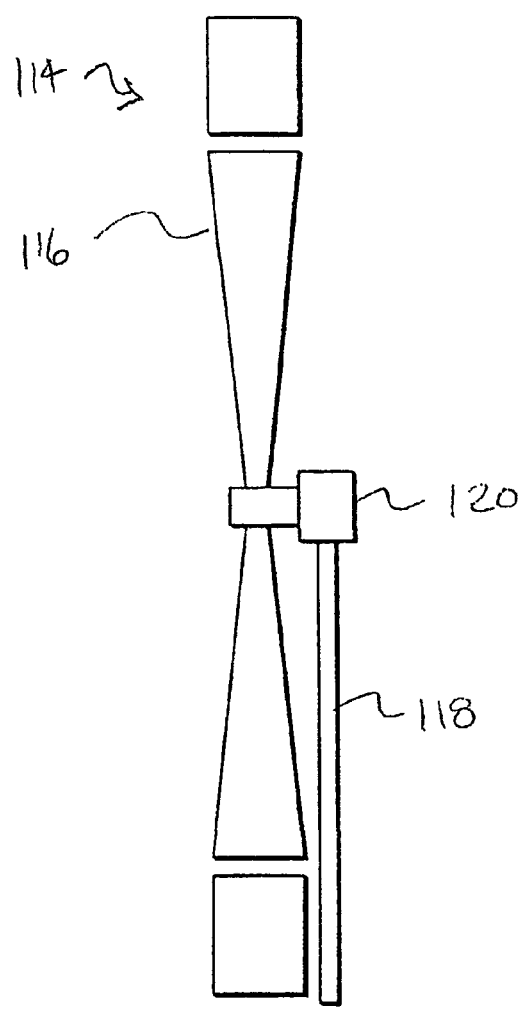
FIG. 23 is a schematic view of a conventional tail rotor or lift fan rotor.
Figure 24:
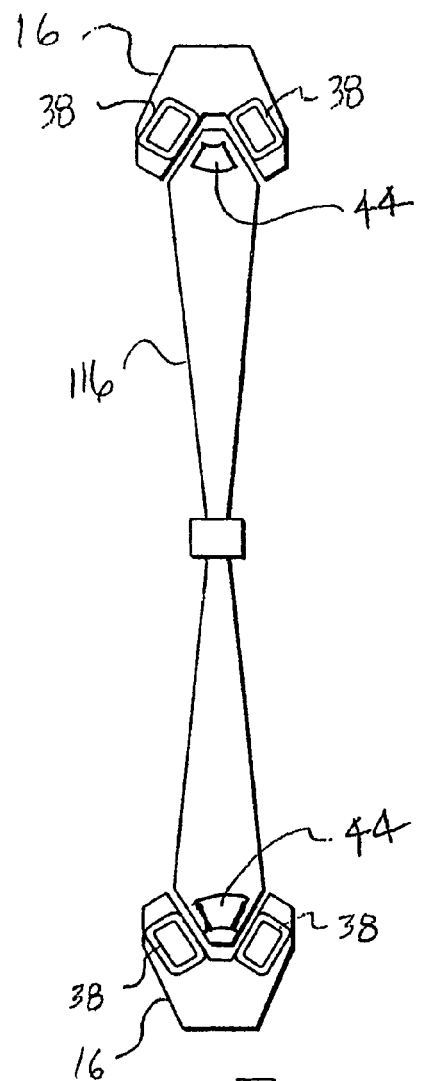
FIG. 24 is a schematic view of a tail rotor or lift fan rotor of the present invention.

In an alternate embodiment, the support and drive system of the present invention may also be used to overcome problems experienced with conventional tail rotors or lift fans 114. A helicopter typically has a main rotor that rotates about a first axis and a tail rotor 116 that rotates about a different axis that is substantially perpendicular to the first axis. Similarly, in an aircraft that uses a combination of a jet turbine engine 22 and a lift fan, the turbine typically rotates about a first axis and the lift fan rotor 116 typically rotates about a different axis that is substantially perpendicular to the first axis. As seen in FIG. 23, conventional tail rotors and lift fans 114 have drive shafts 118 and transmissions or gears 120 that mechanically couple the rotor 116 to an engine 22. These drive shafts 118 and gears 120 are highly stressed, add undesirably to the weight of the craft, and suffer from reliability problems. The present invention eliminates the need for a drive shaft 118 and transmission 120 by using a distributed electric motor to suspend and drive the rotor 116. As seen in FIG. 24, a series of permanent magnets 44 may be provided in the tip ends of the rotor 116. A stator 16 may encircle the rotor 116, and the stator 16 may be provided with support and drive coils 38 and 40 that encircle the circumference of the rotor 116. The high efficiency electric motor drive and magnetic suspension is distributed around the circumference of the fan or rotor 116. Note that several fans can be driven in series in this manner if additional thrust is needed. In this manner, the rotor 116 need not be mechanically coupled to a drive shaft 118 or gear 120. It is simpler and more reliable to provide power to the tail rotor or lift fan rotor 116 in the form of electrical energy produced by a very compact alternator rather in the form of torque. Using a tail rotor or lift fan of the present invention reduces stress on the mechanical components, allows for the elimination of some problematic components, allows for higher redundancy, allows for the elimination of some single point failure modes, and improves performance of the tail rotor or lift fan.

In operation of an aircraft such as one depicted in FIGS. 1-4, an operator would activate the turbine engines 22 to provide power to the alternators 80. Each alternator 80 converts engine torque to electrical energy and provides current to their portions of the upper and lower distributed electric motors. Because the electric motors are divided into sections, a single engine 22 and alternator 80 may power drive coils 40 in both the upper and lower electric motors in the event one or more engines 22 or alternators 80 fails. It is also important to point out that this system provides for redundancy without the need for over-designed and heavy transmissions and cross shafts that are typically necessary in conventional multi-engine transports and tilt-rotor systems to provide redundancy.

When the electric motors are initiated, the rotors 36 and associated airfoil sections are at rest, resting on integral wheels or rollers. The drive coils 40 are activated to produce moving magnetic fields that engage and push or pull the permanent magnets 44 in the rotor 36 to induce rotation of the rotor 36. Rotation of the rotor 36 is increased in a synchronous manner. Magnetic levitation of the rotor 36 is provided by the movement of the permanent magnets 44 embedded in the rotor 36 past the shorted, suspension or support coils 38. Referring to FIG. 22, the movement of the permanent magnets 44 in the rotor 36 induces currents in the support coils 38 that produce a magnetic field that repels the rotor 36 magnetic field. This arrangement provides an important safety feature.

Since the magnetic levitation or support coils 38 are not powered, even a complete power failure will not immediately stop the magnetic levitation. Instead, the magnetic levitation will be present as long as the rotors 36, and therefore airfoils 20, are moving. This enables an operator to use auto-rotation techniques in the event of a failure of all power systems. As discussed above in connection with FIG. 19, magnetic field bridges can be used to operably connect the upper and lower stators 16 to create low reluctance or shunt flux paths between them. In normal operation, the moving magnetic fields move in a continuous fashion about the circumference of either the top electric motor or the bottom electric motor. In the event of a partial failure, the moving magnetic fields 122 that were continuous about the circumference of a motor can remain continuous by traversing a low reluctance path from the top motor to the bottom motor and by traversing another low reluctance path from the bottom motor to the top motor.

As mentioned above, the support coils 38 may also be disposed in a "null flux" configuration (not shown) by connecting corresponding pairs of support coils 38 above and below a rotor 36 in series. In this null flux configuration, the net voltage induced in the coils due to the permanent magnets 44 in the rotor 36 moving past the coils is zero when the rotor 36 is vertically centered in between the support coils 38. This approach is commonly used in the magnetic levitation of trains and has the advantage of minimizing the circulating currents and thus reducing the power dissipated in the coils when the rotor 36 is centered. When the rotor 36 deviates from the central symmetrical position, the induced currents rapidly increase to produce the levitating magnetic field.

A variable frequency current is provided to the drive coils 40 to provide for different rotational speeds by the rotor 36. In the configurations depicted FIGS. 20-22 for producing the variable frequency current through the drive coils 40, the high frequency alternator buss 100 is used to charge the central capacitor 102. Referring to FIG. 20, the CRs are electronically controlled gates that permit current to flow only in the direction of the arrows. CR-B 106 is closed until the capacitor 102 is charged to a positive voltage. After CR-B 106 is deactivated at an alternator 80 current zero and the associated sensor 112 (FIG. 22) determines the magnetic field of the rotor 36 is in the correct position, CR-D 110 is closed to produce a positive half cycle sinusoid in the drive coil and reverse the voltage on the central capacitor 102. The half cycle current produces a magnetic field that repels the rotor 36 magnetic field to move the rotor forward. During the initial half cycle current, the control voltage is removed from CR-D 110 which then ceases conduction when the current returns to zero. When the sensor 112 determines that the rotor 36 has moved to present the opposite polarity of magnetic field, CR-C 108 is closed to generate the negative half cycle and return the capacitor 102 voltage to a positive polarity. As the rotor 36 speed increases, the delay between the positive and negative half cycles of current in the drive coil is reduced such that the delay is zero at maximum rotor 36 speed. Note that CR-A 104 and CR-B 106 can be controlled to add electrical energy to the central capacitor 102 when the capacitor 102 voltage is negative or positive to replace the energy lost in moving the rotor 36.

The drive coils 40 may be connected in series or parallel combinations or may even be operated individually to provide the maximum redundancy and to match the impedance of the alternators. If drive coils 40 are provided above and below the rotor 36, the drive coils 40 are driven in series to make the motor thrust symmetrical. Any number of configurations may be employed to provide the driving force to rotate the rotor 36 relative to the stator 16, including configurations that do not use capacitors, in which case, the system is designed to deliver only the energy required to drive the rotor 36 and to replace the energy dissipated in the coil resistance while storing minimum energy. The power delivery system of the present invention is extremely redundant and reliable due to the distributed drive locations, the common power buss, and multiple power sources. Note also that the azimuthal orientation of the craft is dependent upon the net torque differential in the top and bottom electric motors. Accordingly, precisely controlling the number of drive sections that are actuated can be used to orient the craft precisely to any direction of travel. Using the internal rotor hub 36 configuration as depicted in FIG. 7 simplifies the construction and operation of the electric motors. For example, it eliminates the need to use a Halbach array of permanent magnets. It also permits the rotor hub 36 to expand radially as its speed increases without loss of magnetic interaction and repulsion.

One advantage of an aircraft of the present invention 10 over a conventional helicopter is the possibility of higher lift capability for a given diameter system. One important aspect of the present invention is that it can be operated in hover mode by reducing the blade attack angle, thereby generated the same downwash as a conventional helicopter. Another important aspect of the present invention is that, by increasing the pitch angle, an aircraft of the present invention 10 will offer higher climb rates, higher load capabilities, and more versatility. An aircraft of the present invention also differs from a conventional helicopter in that it offers more options for forward propulsion. Of course, the airfoils 20 used for VTOL operations may also be used for horizontal flight by tilting the rotor 36 plane to provide a portion of the downward thrust vector in the forward or rearward direction, very similar to horizontal propulsion of a conventional helicopter. Low speed horizontal maneuvering may also be accomplished using directional flaps or slats 78 that direct the downward airflow rearward, forward, or to the side (FIG. 5). This method of maneuvering is capable because of the presence of a body or fuselage 12 at the inner circumference of the rotor hub 36 and the presence of a fairing 30 encircling the outer circumference of the airfoils 20. Accordingly, this mode of operation is not possible in conventional helicopters or in tilt-rotor systems. High speed transport is also possible, such as by using a variable bypass jet turbine engine 22 (FIG. 16) that also powers the alternator 80. During VTOL operations, flaps 96 are closed to provide the maximum power to the alternator 80 and to minimize the thrust fan load. During the transition to horizontal flight, flaps 96 are opened to transfer power to the thrust fans 124. As the load on the alternator 80 is decreased, the flow through the fan is increased to transfer the power flow to the fan to obtain maximum forward thrust The directional flaps or slats 78 (FIG. 5) may also be used to divert the downwash 126 from the airfoils 20 for additional thrust. As the horizontal speed increases, the fairing 30 and wings 14 provide increasing portions of the lift reducing the load on the airfoils 20, until the thrust of the turbine engines 22 is used to power horizontal flight as in a conventional jet aircraft. At this point, the airfoils 20 are operated at or near zero pitch.

Figure 25:
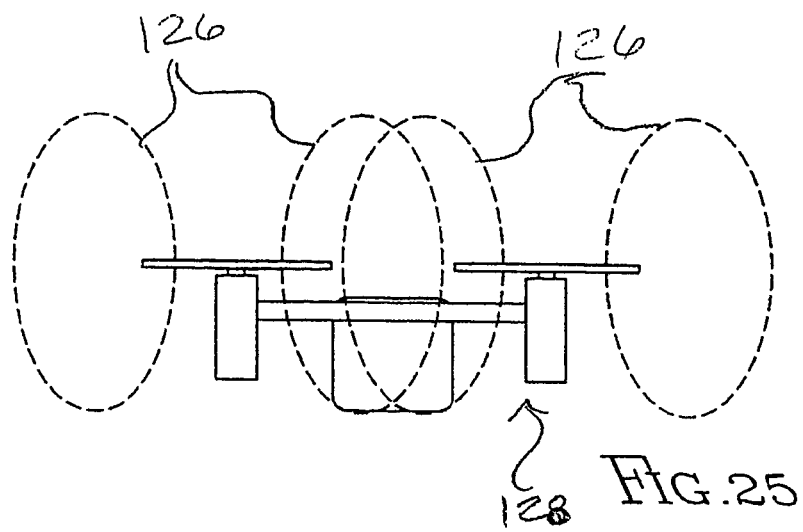
FIG. 25 is a schematic view of downwash and turbulence encountered during VTOL operation of an Osprey aircraft.
Figure 26:
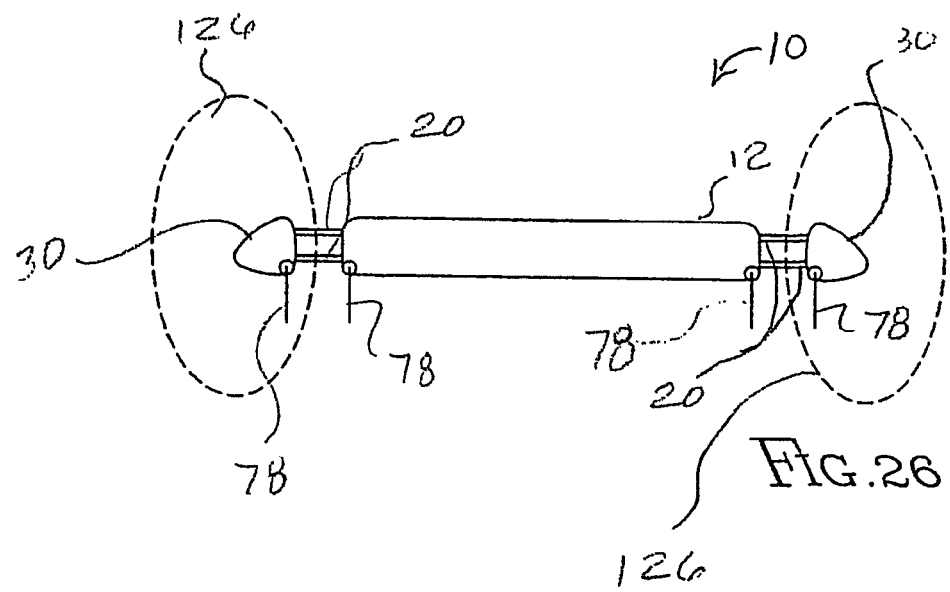
FIG. 26 is a schematic view of downwash and turbulence encountered during VTOL operation of an aircraft of the present invention.

Violent downwash 126 is a concern during VTOL and VSTOL operations, particularly for heavy lift tilt-rotor systems 128, and the present system offers advantages in addressing downwash 126 concerns. Referring to FIGS. 25 and 26, during VTOL operations, the total downwash 126 for two systems with the same load and same diameter are identical. FIGS. 25 and 26 illustrate the very chaotic interaction of the downwash 126 patterns of a multi-tilt rotor system 128 and the uniform downwash 126 pattern of an aircraft of the present invention 10. The total magnitude of the downwash 126 for both systems must be the same in order to lift the same loads, but the aircraft of the present invention 10 creates a downwash 126 that is distributed around the circumference of the system diameter, whereas the tilt-rotor 128 downwash 126 is much more locally intense and interactive. In addition, the downwash 126 from an aircraft of the present invention can be dispersed using vanes on the underside of the aircraft to make the impact of the downwash 126 on the ground less than that of the downwash from the tilt-rotor system.

An aircraft of the present invention 10 offers many advantages over conventional rotorcraft and fixed wing aircraft. The use of counter rotating sets of airfoils 20 eliminates the need for a tail rotor and provides a very stable platform. The large diameters and circumferences of the rotor hub 36 and stator 16 allow the use of a large number of airfoils 20 for additional lift. The large diameters and circumferences of the rotor hub 36 and stator 16 also make it easy to use additional engines 22 and alternators 80, without heavy, complex, unreliable mechanical linkages, to power the electric motors for heavy duty applications or for redundancy. The large diameters and circumferences of the rotor hub 36 and stator 16 also spread the aircraft and load weight over a much larger area such that the magnetic bearing requirements are reasonable and the total lift capacity is much larger than that of other approaches. For example, an aircraft using a Halbach array configuration of permanent magnets 44, such as used in FIGS. 6 and 8, can generate a magnetic repulsive force that can support 40 metric tons per square meter of surface area (4 kG/cm$^2$ or 56 lb/in$^2$) at a velocity of approximately 20 m/s. This is approximately 8 times the maximum lift generated by an airfoil of 7 lbs/in$^2$. As illustrated in Table I, above, an aircraft of the present invention 10 with a rotor hub 36 diameter of approximately 10 m would be capable of providing lift of greater than approximately 30 tons.

In addition to the readily apparent civilian uses for the present invention, the heavy lift capabilities and air mobility of aircraft of the present invention 10 might provide several advantageous military applications. For example, the heavy lift capabilities and large amounts of electrical power onboard make an aircraft of the present invention an ideal platform for many heavy electric weapons, such as electromagnetic guns, lasers, and particle beams. The aircraft provides air mobility, fast response and deployment, and the engines 22 and alternators 80 used for VTOL operations may also be employed to provide a large amount of electrical power to weapons systems. Further, the use of the rotating rotor hubs 36 as flywheel energy storage enables electric weapons applications to be used in flight. The use of a fairing 30 and shutters 76 to enshroud the airfoils 20 increases the efficiency of the airfoils, reduces audible noise, and enables stealth technologies to be better deployed in a rotorcraft. Further still, the aircraft is relatively quiet, stealthy, and fast and is capable of carrying large loads including armor, personnel, and weapons. The aircraft also provides transportation that is not hampered by common obstacles such as terrain, land mines, water, and rivers, and its VTOL capabilities mean that no runways or landing strips are required.

Other modifications, changes and substitutions are intended in the foregoing, and in some instances, some features of the invention will be employed without a corresponding use of other features. For example, the aircraft may be used with or without a fairing 30. Also, The support coils 38 and drive coils 40 may be disposed and powered in any number of ways. Further, the stator 16 and rotor hub 36 may take any number of shapes and sizes and may be operably coupled in any number of ways. Further still, any number of ways may be used to supply power to the electric motors, and drive coils 40 may be used to push or pull the appropriately aligned magnets 44. It is of course understood that all quantitative information is given by way of example and is not intended to limit the scope of the present invention. Accordingly, it is appropriate that the appended claims be construed broadly and in a manner consistent with the scope of the invention.

What is claimed is:

1. An aircraft, comprising:
   a fuselage;
   a first stator secured to said fuselage, wherein said first stator comprises a magnetic bearing comprising a plurality of permanent magnets arranged in a Halbach array;
   a first set of drive coils secured to said first stator;
   a first rotor hub operably coupled to said first stator;
   a first plurality of airfoils secured to said first rotor hub; and
   wherein said first rotor hub comprises:
      a first metal ring; and
      a plurality of carbon fiber bands disposed within said first metal ring.

2. The aircraft of claim 1, further comprising:
   a second stator secured to said fuselage, wherein said second stator comprises a magnetic bearing comprising a plurality of permanent magnets arranged in a Halbach array;
   a second set of drive coils secured to said second stator;
   a second rotor hub operably coupled to said second stator;
   a second plurality of airfoils secured to said second rotor hub; and
   wherein said second rotor hub comprises:
      a second metal ring; and
      a plurality of carbon fiber bands disposed within said second metal ring.

3. The aircraft of claim 2, wherein said first plurality of airfoils rotates in a first direction, and said second plurality of airfoils rotates in a second direction.

4. The aircraft of claim 3, wherein said first direction is one of clockwise and counterclockwise, and said second direction is opposite said first direction.

5. The aircraft of claim 2, further comprising at least two engines secured to said fuselage.

6. The aircraft of claim 5, further comprising a number of alternators equal to the number of said engines, wherein each of said alternators is operably coupled to one of said engines whereby said alternators are powered by said engines.

7. The aircraft of claim 6, wherein at least one of said alternators is operably coupled to a first subset of said first set of drive coils and a first subset of said second set of drive coils, at least one other of said alternators is operably coupled to a second subset of said first set of drive coils and a second subset of said second set of drive coils, and each of said first and second sets of drive coils are evenly distributed around a circumference of the aircraft.

8. The aircraft of claim 1, further comprising a plurality of wings non-rotatably attached to said fuselage.

9. An aircraft, comprising
   a fuselage;
   a first stator secured to said fuselage, wherein said first stator comprises a first magnetic bearing comprising a plurality of permanent magnets arranged in a Halbach array;
   a first set of drive coils secured to said first stator;
   a first rotor hub operably coupled to said first stator;
   a first plurality of airfoils, wherein each of said first plurality of airfoils comprises a proximal end and a distal end, and each of said first plurality of airfoils is connected to said first rotor hub at said proximal end;

a fairing non-rotatably secured to said fuselage;

a first magnetic bearing secured to said fairing, wherein said distal ends of said first plurality of airfoils are operably coupled to said first magnetic bearing;

a first auxiliary bearing at a circumference of the aircraft in proximity to the first hub, said auxiliary bearing comprising a plurality of permanent magnets; and a first plurality of pitch control arms, each of said first plurality of pitch control arms connected to one of said first-plurality of airfoils and operably engaged with said first auxiliary bearing, whereby a pitch of each of said first plurality of airfoils is adjusted by manipulation of said first plurality of pitch control arms.

10. The aircraft of claim 9, further comprising a second stator secured to said fuselage, wherein said second stator comprises a second magnetic bearing comprising a plurality of permanent magnets arranged in a Halbach array;

a second set of drive coils secured to said second stator;

a second rotor hub operably coupled to said second stator;

a second plurality of airfoils, wherein each of said second plurality of airfoils comprises a proximal end and a distal end, and each of said second plurality of airfoils is connected to said second rotor hub at said proximal end;

a second magnetic bearing secured to said fairing, wherein said distal ends of said second plurality of airfoils are operably coupled to said second magnetic bearing;

a second auxiliary bearing at a circumference of the aircraft in proximity to the second hub, said second auxiliary bearing comprising a plurality of permanent magnets; and a second plurality of pitch control arms, each of said second plurality of pitch control arms connected to one of said second plurality of airfoils and operably engaged with said second auxiliary bearing, whereby a pitch of each of said second plurality of airfoils is adjusted by manipulation of said second plurality of pitch control arms.

* * * * *